Nov. 2, 1937.

K. W. JARVIS ET AL

Re. 20,545

ELECTRON TUBE

Original Filed Sept. 15, 1926

INVENTORS
KENNETH W. JARVIS
BY RUSSELL M. BLAIR
Potter, Pierce & Scheffler,
ATTORNEYS Reissued Nov. 2, 1937

Re. 20,545

UNITED STATES PATENT OFFICE 20,545

ELECTRON TUBE

Kenneth W. Jarvis, New Rochelle, N. Y., and
Russell M. Blair, Teaneck, N. J.

Original No. 1,903,569, dated April 11, 1933, Serial No. 135,604, September 15, 1926. Application for reissue April 8, 1935, Serial No. 16,108

36 Claims. (Cl. 179—171)

Our invention relates broadly to electron tubes and more particularly arrangements of tube structure for securing increased operating efficiency over that heretofore obtainable.

One of the objects of our invention is to provide a construction of electron discharge device where substantially all electrostatic coupling between output and input electrodes is eliminated.

Another object of our invention is to provide a construction of electron discharge device wherein the phenomena of secondary emission is employed for securing substantially pure relay action for increasing the ability of the electron discharge device to function as a repeater.

Another object of our invention is to provide an arrangement in an electron tube device wherein the output power and voltage relations have substantially no effect on the tube characteristics which results in the tube functioning as a true one way repeater and also has the advantage in that it does not absorb power from either the input or output circuits.

Another object of our invention is to provide an electron tube construction and arrangement of the electrodes therein for the securing of high amplification in signal receiving systems where the principle of secondary emission current alone in the output circuit is employed as differentiated from the principle where primary emission is relied upon for the functioning of the electron tube system.

Figure 4:
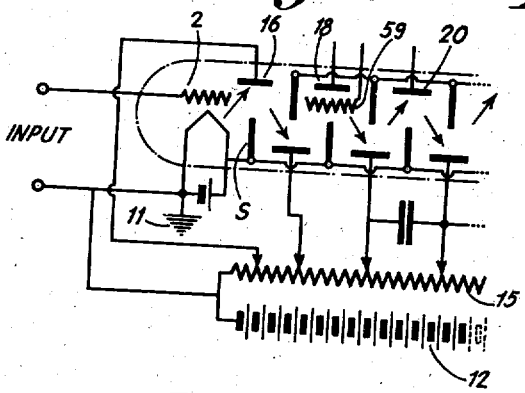
Figure 1:
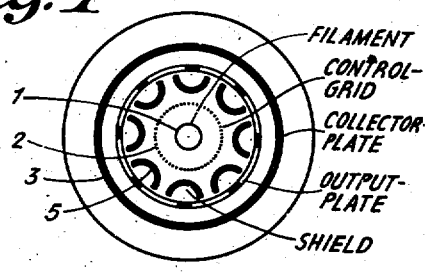
Figure 5:
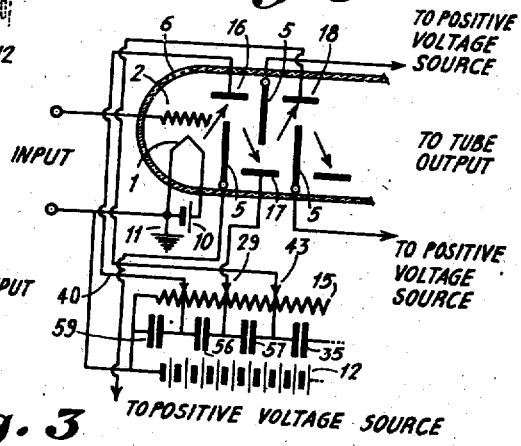
Figure 2:
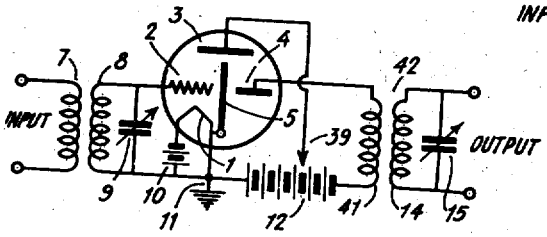
Figure 3:
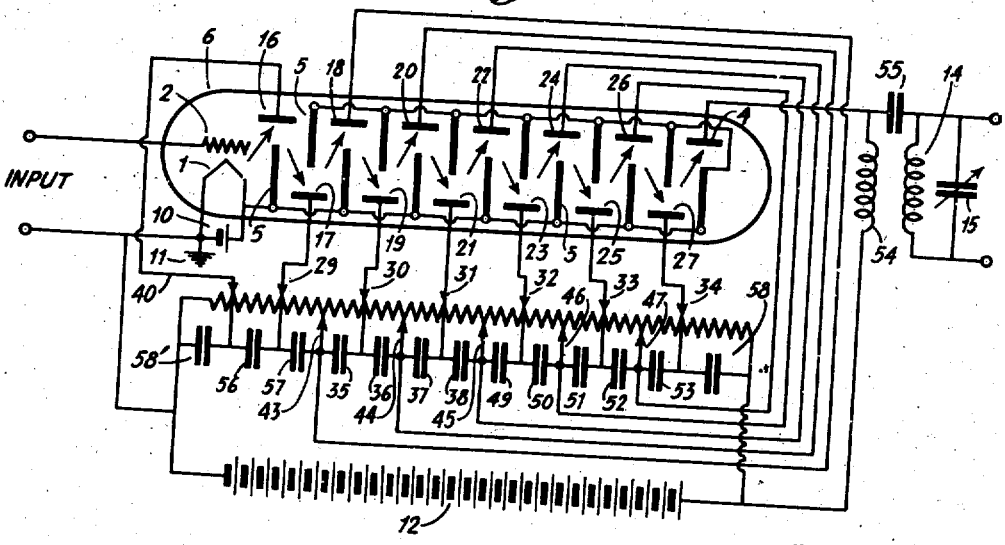

Other and further objects of our invention reside in the structural relationship of a plurality of electrodes and electrostatic shields within an electron tube embodying a novel principle of operation as will be more fully described hereinafter by reference to the accompanying drawing in which:

Figure 1 is a diagrammatic representation of the several electrodes employed in one type of electron discharge device of our invention; Fig. 2 is a diagrammatic circuit arrangement illustrating the principle of operation of the electron tube structure of our invention; Fig. 3 illustrates a multiple electron tube discharge device employing the principles of our invention; Fig. 4 illustrates a modified circuit arrangement for the electron tube of our invention; and Fig. 5 illustrates a slight modification of the arrangement shown by Fig. 3.

Heretofore in the communication art, sensitive electron tube amplification circuits have been employed in signal receiving circuits, but it has been found that their operating efficiency has been considerably limited and impaired by the existence of capacity coupling between the output and control electrodes of each of the tubes. Various methods have been proposed for compensating for the undesired capacity coupling, but such methods are merely systems of compensation which do not offer a cure for the inherent coupling. By our invention we provide a novel construction of the electron discharge device so as to substantially eliminate all output to input capacity coupling which previously occurred between the tube electrodes.

Among other novel features in combination, we employ in the operation of the electron discharge device of our invention the phenomena of secondary emission. A primary source of electrons, such as a heated cathode, is provided within an evacuated vessel, the electronic movement therefrom being controlled by a grid electrode. This controlled electron stream impinges against a treated anode held at a positive potential with respect to the cathode. We have termed this anode the "collector plate" and while it is held at a positive potential with respect to the cathode, it is substantially grounded to the cathode so far as alternating currents are concerned. This collector plate serves as a source of secondary emission for the output plate circuit. A fourth element, the "output plate", is placed so as to receive the secondary emission of the collector plate.

The positions of the cathode, control grid, collector plate and output plate are so chosen that shielding elements, grounded to the cathode, with respect to alternating currents, may be placed between the output plate and the control grid. These shielding elements by proper design may at the same time be placed between the output plate and the cathode. The purpose of these shielding elements is twofold. First, to substantially prevent any electrostatic coupling between the output plate and control grid, and second to substantially prevent the output plate potential from influencing the primary emission from the cathode, and to prevent any primary emission reaching the output plate directly. To this end, the shape and position of these shielding elements should be such that it is impossible to draw a straight line between any chosen points on the grid and output plate without passing through the shielding elements. The shielding elements, hereafter termed the shield, may at the same time be placed so as to prevent any straight line being drawn from the output plate to the cathode without passing through the shield. This construction substantially frees the tube from any inherent undesired electrostatic coupling.

The novel relay action due to the phenomena of secondary emission is obtained by the arrangement of the electrodes within the tube. In the usual three element electron tube heretofore available in the art, the voltage across the output load adds and subtracts from the applied direct plate voltage and materially affects the amplifying characteristics. In a regenerative radio receiver it often causes the establishment of a periodic variation in current which becomes evident in the form of undesired noises. In an amplifier it may cause distortion. In an oscillator it causes a change in oscillating frequency as the output load is changed. These disadvantages are avoided in the tube of our construction. When the positive potential of the output plate is made high enough with respect to the collector plate, all of the secondary electrons from the collector plate will travel to the output plate. This positive potential necessarily is the equivalent of the plate saturation potential of a two element tube. If the secondary emission is small, a small potential difference may be sufficient. For higher values of secondary emission a correspondingly higher voltage might be necessary. It will be understood, however, that if this maintained potential difference between the output plate and collector plate, minus the maximum output potential across the load, is still greater than the plate saturation potential as defined above, changing the output load voltage will have substantially no effect on the characteristics of the tube and the system will be free from all such detrimental effects as noted above.

To an additional external voltage in the output plate circuit, (saturation potential being maintained) the tube offers an infinite impedance. Therefore the tube will absorb no power from the external system, and when applied to an electrical network will not cause any loss to that network system. As typical of the beneficial results obtained in our system, the selectivity and amplification in a radio frequency amplifier are correspondingly improved.

The relay function of the electron tube structure of our invention, due to the phenomena of secondary emission, is such that the amplifying ratio may be made very large. By the proper preparation of the collector plate the secondary emission may be made a large multiple of the primary emission and the amplifying characteristics of the tube correspondingly increased. By utilizing a multiple number of electrodes within the tube structure amplification at extremely high ratios is obtainable.

Referring to the drawing in more detail, we have represented at Fig. 1 the electron tube structure of our invention employing a filament or cathode designated by reference character 1 surrounded by a control grid 2. The collector plate is represented at 3 connected to a point of positive potential 39 on battery 12 as represented in Fig. 2. The output plate 4 is represented as separated from the control grid 2 and cathode 1 by means of the shield 5 for reducing undesired electrostatic coupling and preventing the flow of primary emission to the output plate 4. The output electrode 4 and the electrode 5 each have alternately arranged solid and open portions, and the solid portions of the shield electrode are in alignment with the electron emitter and the solid portions of the output electrode.

In Fig. 2 we have shown a diagrammatic circuit arrangement such as might be used in a radio frequency amplifier system wherein the input potential is supplied through a transformer system having primary winding 7 with a secondary winding 8 coupled thereto and tuned by means of a condenser 9. The cathode 1 is heated from a suitable source 10, the cathode being grounded at 11 as is also the electrostatic shield 5, which connects to one side of the cathode. The output circuit of such a radio frequency amplifier system is represented as including the primary winding 41 of coupling transformer 42 connected between the output plate 4 and high potential battery 12. Secondary winding 14 is coupled to primary winding 41 and is shunted by the tuning condenser 15. It will be understood that while the tube structure is so devised as to make it a more efficient amplifier, the tube may also function as a detector, an oscillator, or modulator, or in other ways well known to the art.

In order to increase the amplification obtainable in the electron tube device of our invention a multiple tube may be arranged as represented in Fig. 3 for obtaining a lower effective coupling capacity between the grid electrode 2 and the output plate 17, thereby improving the characteristics of the tube system. While the capacity coupling existing in the tube circuit represented in Fig. 2 is substantially negligible, this capacity coupling is further reduced by using a number of relay stages as illustrated in Fig. 3. In addition to serving as a better amplifier an electron tube constructed in the general manner of Fig. 3 may serve in other ways, such as a detector or oscillator or modulator.

In Fig. 3 of the drawing reference character 1 represents the cathode serving as a source of electrons which are directed to an intermediate collector plate 16 by virtue of the positive charge imparted to collector plate 16 from a potential source such as the tap 40 on the potentiometer 15 across battery 12. The grid electrode 2 serves to control the primary emission of cathode 1 with respect to the intermediate collector plate 16, but thereafter the intermediate collector plate 16, which is properly treated to produce secondary emission, serves as a cathode for the intermediate output plate 17 connected to a point of higher positive potential 29 on potentiometer 15. The output intermediate plate 17 is treated to produce secondary emission and serves as a cathode for the next succeeding plate element 18, which connects to point 43 on potentiometer 15 at the next higher positive potential. The plate element 18 serves as a cathode for plate 19 which connects to the positive point 30 along potentiometer 15. In a similar manner plate members 20, 22, 24 and 26 are arranged to receive and emit electrons to the succeeding plates 21, 23, 25 and 27 with an electrostatic shield 5 interposed between the successive plate electrodes. The plate member 27 finally emits electrons which bombard the output plate 4 connected to the output circuit. It will be observed that plate members 20, 21, 22, 23, 24, 25, 26 and 27 connected to points 44, 31, 45, 32, 46, 33, 47 and 34 along potentiometer 15, which are maintained at successively higher potentials. Condensers 35, 36, 37, 38, 49, 50, 51, 52, 53, 56, 57, 58 and 58′ may be connected between the successive plate electrodes for avoiding undue resistance coupling, due to the method of applying the positive potential to the intermediate collector plates.

The undulatory or zig-zag path of the electron stream from the source to the output electrode is indicated by the arrows of Fig. 3. This path is determined by the electrostatic field established between the electron source and the output electrode by the steady potentials applied to the electrodes or electron-emitting surfaces. The described arrangement of the electron-emitting surfaces and the progressively increased potentials obviously result in an electric field which, with respect to electron-emitting surfaces, has a component normal to the respective surfaces and a component longitudinal to the surfaces. The electron-emitting surfaces are located at the junctions of the several branches of the undulatory or zig-zag path (or electrostatic field) and the electrons which arrive at an emitting surface along one branch of the path release a greater number of secondary electrons that are moved away, by the electrostatic field, along a reversely-directed path or branch lying at a substantial angle to the approaching branch. As illustrated in Fig. 3, the groups of surfaces at each side of the axis of the tube each constitute an assembly or electrode means of longitudinally alined surfaces, the active portions of each surface of each electrode means being longitudinally spaced with respect to an opposed pair of active portions of the other electrode means.

All of the electrodes may be mounted within the same envelope 6. The control electrode may be placed as represented between cathode 1 and intermediate collector plate 16 or between any other two electrodes in the series as indicated in Fig. 4 by reference character 59, or in combinations between the electrodes of any two or more pairs of electrodes. The multiplying action of each secondary emission relay times the number of stages may total to a large ratio. In some instances the electron emitting body may be a substantially self-sustaining source of electrons such as radioactive material. The plate elements 16, 17, 18, 19, 20, 21, 22, 23, 24, 25, 26 and 27 do not depend upon incandescence for their operation but upon the ability of the elements to effect secondary emission under conditions of bombardment.

The output of the tube system may be coupled to the succeeding circuit by means of the radio frequency choke coil 54 and condenser 55 to the tuned output circuit 14—15.

The principles of our invention may be embodied in a variety of different constructions of electron tubes, and we desire that it be understood that various modifications in the construction and arrangement of the electrodes may be employed for carrying out the principles of our invention without departing from the spirit of our invention. We may in some instances provide connections between a source of positive potential and the electrostatic shields and such a modification has been illustrated by Fig. 5 wherein the reference numerals correspond to those used to identify the various portions and parts of Fig. 3. Other changes or improvements may be made, as will readily suggest themselves to those skilled in the art, and we intend no limitations other than are imposed by the scope of the appended claims.

What we claim as new and desire to secure by Letters Patent of the United States is as follows:

1. An electron tube device comprising an evacuated vessel, a plurality of electrodes within said vessel, one of said electrodes comprising an electron emitting body, a grid electrode mounted adjacent said electron emitting body, a pair of plate electrodes adapted to be charged to different positive potentials mounted adjacent said grid electrode, and a shield connected inside of said vessel with said electron emitting body and having a solid portion thereof physically interposed between said electron emitting body and the plate electrode of largest positive potential for substantially eliminating the effects of capacity coupling between said grid electrode and the plate electrode of largest positive potential.

2. An electron tube comprising an evacuated vessel, a plurality of electrodes within said vessel, one of said electrodes comprising an electron emitting body, another of said electrodes being a control member, and a plurality of plate electrodes adapted to be charged at successively increasing positive potentials relative to their distance from said electron emitting body, one of said plate electrodes being mounted adjacent said control member, and electrostatic shields interposed between said electron emitting body and the plate electrode immediately adjacent said control member for eliminating the effects of capacity coupling.

3. An electron tube comprising an evacuated vessel containing an electron emitting body, a control electrode, an output plate electrode and a plurality of collector plates, means interposed between the first of said collector plates and both said electron emitting body and control electrode and between each succeeding pair of collector plates for eliminating capacity coupling between said output plate and said control electrode.

4. An electron tube comprising an evacuated vessel, an electron emitting body in said vessel, a control electrode, an output plate electrode and a plurality of collector plates adapted to be charged at successively increasing positive potentials interposed between said control electrode and said output plate, and means interposed between succeeding collector plates for electrostatically shielding said output plate from said electron emitting body and said control electrode.

5. An electron discharge device, comprising an evacuated vessel, a cathode to emit primary electrons, a plurality of electrodes, a collector plate electrode mounted to emit secondary electrons under bombardment of primary electrons, an output plate electrode positioned with respect to said collector plate to receive the secondary electron emission from said collector plate electrode, and a shielding element connected with said cathode and disposed adjacent said output plate for substantially shielding the output plate electrode from all electrodes except the collector plate electrode.

6. An electron discharge device comprising an evacuated vessel containing a source of primary electrons, a control member, a plate electrode mounted to receive electronic bombardment from said source and emit secondary electrons, an output plate and a shielding element connected with said source of primary electrons and disposed between said output plate and said control member in such manner that a straight line cannot be drawn through any point on the output plate and said control member without passing through said shielding element.

7. An electron tube comprising an evacuated vessel, an electron emitting body in said vessel, a control electrode, an output plate electrode, and a plurality of collector plates adapted to be maintained at positive potential with respect to the cathode and each with respect to the preceding collector plate interposed between the output plate and the cathode, the control electrode being interposed between any pair of said collector plates and an electrostatic shield interposed between said control electrode and said output plate and connected to said cathode for eliminating output to input capacity coupling between said electrodes.

8. An electron tube comprising an evacuated vessel, an electron emitter disposed therein, a control electrode adjacent thereto, a collector plate, an output plate adjacent said collector plate, said output plate having a plurality of alternate, solid and open portions, and a shield having a plurality of solid portions disposed adjacent the solid portions of said output plate in alignment with said electron emitter and said solid portions, whereby electrons from said electron emitter are prevented from reaching said output plate.

9. An electron tube comprising an evacuated vessel, a primary source of electrons therein, a pair of concentrically positioned plate electrodes disposed about said primary source of electrons at different radial distances therefrom, the outermost plate electrode constituting a collector plate with respect to the electrons emitted by the primary source or electrons, the innermost plate electrode constituting an output plate and having a multiplicity of alternate, solid and open portions, a control electrode disposed about said primary source of electrons, and a shield constituted by a plurality of alternate, solid and open portions with the solid portions thereof radially aligned with said electron emitter and with the solid portions of said output plate and the open portions thereof aligned with the open portions of said output plate, whereby said output plate is screened from electron discharge from said primary source of electrons while said output plate is subject to bombardment by secondary discharge from said collector plate.

10. An electron tube comprising an evacuated vessel, a primary source of electrons therein, a pair of plate electrodes concentrically disposed about said primary source of electrons at different radial distances therefrom, the outermost plate electrode constituting a collector plate with respect to electron discharge from said primary source of electrons, the innermost plate electrode constituting an output plate subject to secondary bombardment with respect to said collector plate, said output plate having a plurality of alternate, solid and open portions, a control electrode adjacent said primary source of electrons, and a plurality of shielding elements disposed intermediate said primary source of electrons and said output plate, one of said shielding elements being individual to each of the solid portions of said output plate for preventing primary emission from said primary source of electrons from reaching said output plate while permitting the bombardment of said collector plate by electrons from said primary source of electrons.

11. An electron tube comprising an evacuated vessel, a primary source of electrons therein, a control electrode disposed adjacent thereto, a plurality of plate electrodes disposed at different radial distances from said primary source of electrons, the outermost plate electrode constituting a collector plate, the innermost plate electrode constituting an output plate and having a plurality of alternate, solid and open portions, and a shield having a plurality of substantially semicircular solid portions separated by open portions, the solid portions thereof being disposed in alignment with the solid portions of said output plate and the open portions therebetween being disposed in alignment with the open portions of said output plate whereby primary emission from said primary source of electrons is prevented from reaching said output plate while bombarding said collector plate.

12. An electron tube device comprising an evacuated vessel, a filament electrode, a control electrode, a pair of plate electrodes adapted to be charged at differing positive potentials, one of said plate electrodes comprising an output plate and the other of said plate electrodes constituting an electron emitting body, and means connected with said filament electrode and interposed between said output plate and said filament electrode for eliminating the effect of electrostatic capacity between said control electrode and said output plate.

13. In an electronic device, the combination of an electron source, a plurality of staggered electrodes disposed at successively greater distances from the source and each capable of emitting under electron impact secondary electrons, said electrodes being adapted to have applied thereto voltages positive with respect to the source and of progressively increasing values in conformity to the remoteness of spacing from the source so that electrostatic fields are produced within the tube and between the said staggered electrodes, a shield electrode in registry with the space between alternate electrodes for causing the electron streams impinging upon and leaving each staggered electrode to follow separate paths, and an electrode for collecting the electron stream leaving the staggered electrode most remote from the source.

14. An electron discharge amplifier comprising a primary electron emitter, an output anode and a plurality of independent impact electron emitting areas distributed in staggered fashion intermediate the primary electron emitter and the output anode, said areas and said output electrode being adapted to be maintained at positive potential relative to the primary emitter and at differing positive potentials increasing successively with the distance from said primary emitter to a maximum positive potential at said output anode, whereby electrostatic fields are developed within the tube and between the staggered electrodes, and a shield electrode intermediate alternate areas for causing the produced electric field within the tube to cause the electron stream to impinge upon and leave each of said emitting areas along different paths having a velocity component in the direction of the greatest positive voltage connection point.

15. The electron discharge amplifier claimed in the preceding claim comprising, in addition, means to control the primary electron emission reaching the first of said impact electron emitting areas.

16. The device claimed in claim 14 comprising, in addition, means disposed intermediate the primary electron emitter and the output anode to control the intensity of the electron stream reaching the anode member.

17. In combination, means for producing a controlled electron stream, a plurality of opposed surfaces adapted to liberate electrons by secondary emission, one of said surfaces being in the path of said controlled electron stream, means for producing a potential increase between each one and the next succeeding of said surfaces so that the electrons leaving each surface successively reach the next succeeding surface, and an output electrode for collecting the electron emission from the last of said plurality of pairs of surfaces.

18. In an electron tube device, a source of electrons, a plurality of opposed and longitudinally arranged surfaces adapted to liberate electrons by secondary emission, the first of said surfaces being positioned to receive electrons from said source, said surfaces being adapted when subjected to a potential gradient from one surface to the next to produce an undulating progression of electrons from one surface to the next succeeding surface, and an output electrode for collecting the electron emission from the last of said surfaces.

19. In combination, means for producing a grid-controlled electron stream, a pair of opposed surfaces adapted to liberate electrons by secondary emission, the first of said surfaces being positioned to intercept said electron stream, means cooperating with said surfaces to direct electrons leaving said first surface to the second surface, and an output electrode for collecting the electron emission from the second surfaces.

20. In an electron tube device, a source of electrons, a plurality of opposed and longitudinally disposed surfaces having the property of liberating electrons by secondary emission and adapted to be maintained at successively higher potentials with respect to said source, the first of said surfaces being positioned to receive electrons from said source, means cooperating with said surfaces to restrict the travel of electrons leaving each surface except the last substantially to a path leading to the next succeeding surface, and an output electrode for collecting the electron emission from the last of said surfaces.

21. In an electron tube device, a source of electrons, an output electrode, and a plurality of pairs of opposed surfaces having the property of liberating electrons by secondary emission, said opposed surfaces being progressively arranged along the electron path between said source and said electrode and charged at successively higher positive potentials in a direction from the source towards said electrode, thereby to establish between said source and said electrode an undulating electric field for directing electrons to a surface from the adjacent opposed surface positioned closer to the source.

22. In combination, a source of electrons, opposed surfaces adapted to liberate electrons by secondary emission, and means for producing between said opposed surfaces an electric field for establishing an undulatory progression of electrons between and longitudinally of said opposed surfaces, one surface including a portion positioned to receive electrons from said source.

23. The invention as claimed in claim 22, in combination with an output electrode positioned to intercept the stream of secondary electrons liberated from one of said surfaces.

24. In an electron tube device, a source of electrons, an output electrode, and a plurality of surfaces adapted to liberate electrons by secondary emission, a portion of one surface being positioned to receive an electron stream from said source, another of said surfaces having a portion opposed to said stream-intercepting portion and spaced longitudinally thereof in a direction towards said output electrode, said stream-intercepting portion of the first of said surfaces being adapted to be charged at a positive potential higher than that of said source and lower than that of the said opposed portion of the second of said surfaces.

25. In an electron tube device, a source of electrons, an output electrode, a pair of electrode means opposed to each other and including surface portions adapted to liberate electrons by secondary emission, the electron-liberating portions of each electrode means being longitudinally alined with respect to adjacent portions of the same electrode means and longitudinally displaced with respect to an opposed pair of adjacent electron-liberating portions of the other electrode means, and means for charging the respective electron-liberating portions at potentials increasing progressively in a direction from said source to said output electrode.

26. In an electron tube device, a source of electrons, an output electrode, and a pair of electrode means opposed to each other and including surface portions adapted to liberate electrons by secondary emission, the electron-liberating portions of each electrode means being longitudinally alined with respect to adjacent portions of the same electrode means and longitudinally displaced with respect to an opposed pair of adjacent electron-liberating portions of the other electrode means, an electron-liberating portion of one electrode means being positioned to receive electrons from said source and said output electrode being positioned to intercept the electrons liberated by one of said electron-liberating portions, whereby an undulating progression of electrons takes place between said electrode means when respective electron-liberating portions are at progressively higher potentials as viewed in a direction from said source towards said output electrode.

27. In combination, a source of electrons, a plurality of electrode means having surfaces adapted to liberate electrons by secondary emission, means for producing an electrostatic field to constitute the agency for guiding electrons from one surface to another, said field-producing means including electrodes additional to said electrode means and a current source for establishing on said electrode means and said electrodes potentials with respect to said source of electrons which create the guiding electrostatic field, a portion of one electron-liberating surface being positioned to receive electrons from said source, and an electrode positioned to receive the electrons emitted from a portion of an electron-liberating surface that is spaced from said electron-receiving portion.

28. In combination, a source of electrons, a pair of electrode means having opposed surfaces each adapted to liberate electrons by secondary emission, the electron-liberating surfaces of each electrode means being adapted to have applied thereto voltages positive with respect to said source and of values progressively increasing with the remoteness of the surface from the source, a portion of an electron-liberating surface adjacent said source being positioned to receive electrons from said source, and an output electrode for receiving the electrons emitted from a portion of an electron-liberating surface furthest from said source.

29. The combination in an electronic device, of means to produce an electron stream, means for controlling the magnitude of the electron stream, and means including opposed electrodes receiving said controlled electron stream for repeatedly amplifying the same in the form of emitted secondary electrons.

30. The combination within an electronic tube, of a source of electrons, a plurality of secondary-electron-emitting electrodes held at potentials positive with relation to said source of electrons, a control electrode, electrode means between said source of electrons and certain of said secondary-electron-emitting electrodes held at such potential with relation to the said certain secondary-electron-emitting electrodes as to shield the electrons in the vicinity of said control electrode from the strong electro-positive field of said certain secondary-electron-emitting electrodes, and an output electrode more positively charged than any other electrode in the tube.

31. In combination, means to cause a flow of electrons, means for causing the developed electron flow to follow a succession of reversing paths, and a surface adapted to emit secondary electrons in greater number than the impinging electrons positioned at the termination of each independent reversing path.

32. The combination with an output electrode and electrostatic means for establishing a flow of electrons along a zig-zag path terminating at said output electrode, of surfaces adapted to liberate secondary electrons positioned at the junctions of adjacent branches of said zig-zag path.

33. The combination of a pair of opposed surfaces adapted to liberate secondary electrons, an output electrode, and means for establishing an electrostatic field between said surfaces and said output electrode to direct to one of said surfaces the secondary electrons released from the other of said surfaces, said means including a source of direct current potential for maintaining said output electrode at a more positive potential than either of said surfaces.

34. In an electron tube, the combination of an output electrode having an opening therethrough for the passage of an electron stream, a source of electrons and a surface for emitting secondary electrons positioned at opposite sides of said output electrode, means for establishing a potential difference between said electron source and said surface to create a flow of electrons from said source through said output electrode and to said surface, whereby secondary electrons are emitted from said surface, and means maintaining said output electrode at a higher direct current potential than said surface, whereby secondary electrons are attracted to said output electrode.

35. The method of amplifying an electron flow by means of surfaces adapted to liberate secondary electrons which comprises creating an electrostatic field to accelerate and guide secondary electrons liberated from one such surface, and positioning another such surface in opposed relation to the first surface and in the path of electrons liberated therefrom.

36. An electronic device comprising electrostatic means including impact surfaces for producing an electron flow along a path having a plurality of serially disposed segments of successively different directions, said impact surfaces being adapted to emit secondary electrons in a number greater than the number of impinging electrons and being located at the junctions of adjacent segments of said path, and an output electrode positioned to collect the electron flow developed by travel of the electron stream along a succession of the segments of said path.

KENNETH W. JARVIS.
RUSSELL M. BLAIR.